Oct. 29, 1963   J. BOCHAN   3,108,613

THREE-WAY VALVE

Filed Feb. 23, 1961

INVENTOR.
JOHN BOCHAN
BY
HIS ATTORNEY

United States Patent Office 3,108,613
Patented Oct. 29, 1963

3,108,613
THREE-WAY VALVE
John Bochan, Louisville, Ky., assignor to General Electric Company, a corporation of New York
Filed Feb. 23, 1961, Ser. No. 91,138
1 Claim. (Cl. 137—609)

This invention relates to valves, and more particularly to a three-way valve in which one opening is alternatively connected with either of two other openings.

It is an object of my invention to provide a three-way valve having a single actuating member which connects the first opening alternatively to either the second or the third opening, with the other opening being removed from the hydraulic circuit.

A further more specific object of my invention is to provide a three-way valve wherein the two passages from the first to the second and third openings respectively are formed of flexible material on their interior sides, and a single actuating member between them has two positions in which it alternatively forces one of the flexible walls to a position squeezing its passage closed while opening the other one of the passages.

In carrying out my invention in one aspect thereof, I provide a valve which has a housing of rigid material with three openings. A first deformable wall portion is positioned within the housing and is arranged so that it abuts the housing and forms with it a first passage joining the first and second openings. Similarly, a second deformable wall portion is positioned within the housing in abutting relation thereto and forms a second passage joining the first and third openings. Between the two wall portions, there is an actuating member which is movable to first and second positions. In its first position, the actuating member deforms one of the wall portions to close the first passage and in its other position the actuating member deforms the other wall portion to close the second passage. In each case, when one passage is closed by the actuating member the other passage is opened. Thus, the single actuating member movable to two positions is caused, by its positioning between the two flexible portions of the two passages, to alternatively open and close the passages.

The subject matter which I regard as my invention is particularly pointed out and distinctly claimed in the concluding portion of this specification. The invention itself, however, both as to organization and method of operation together with further objects and advantages thereof, may best be understood by reference to the following description taken in conjunction with the accompanying drawing.

Figure 1:
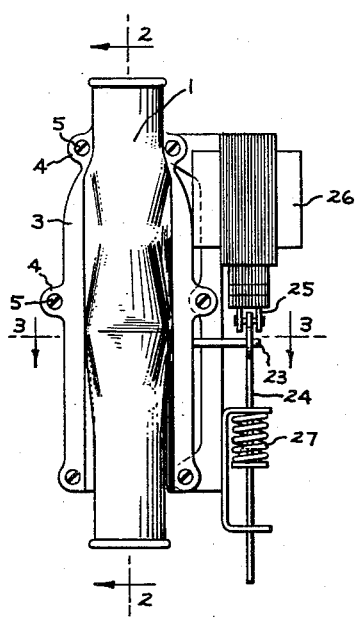
Figure 2:
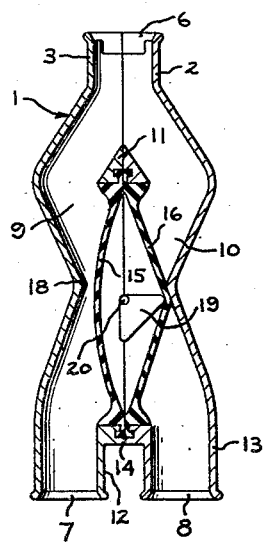
Figure 3:
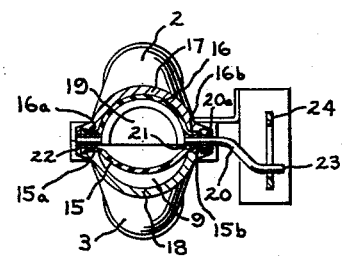
Figure 4:
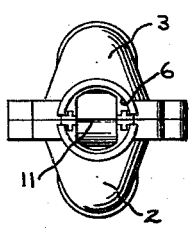
Figure 5:
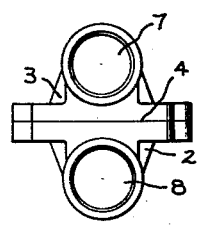
Figure 6:
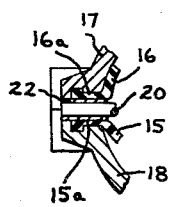

In the drawing,
FIGURE 1 is a side elevational view of the improved valve of this invention;
FIGURE 2 is a view along line 2—2 in FIGURE 1;
FIGURE 3 is a view along line 3—3 in FIGURE 1;
FIGURE 4 is an end view viewing the valve of FIGURE 1 from the top thereof;
FIGURE 5 is an end view of my valve viewing it from the bottom thereof as shown in FIGURE 1; and
FIGURE 6 is an enlarged view of a part of the structure shown in FIGURE 3.

Referring now to the figures of the drawing, there is shown a rigid valve housing 1 which is preferably formed of two separate identical parts 2 and 3 secured in abutting relationship together by any appropriate means. Such means may, for instance, be provided in the form of outwardly extending abutting flanges 4 on the two parts, with screws 5 extending through flanges 4 to hold the two parts together.

When the two parts 2 and 3 are assembled to make the housing 1 as shown, they form a housing which has a single opening 6 formed at one end thereof and a pair of openings 7 and 8 formed at the other end thereof. Opening 6 is connected through the housing by a passage 9 to opening 7 and by a passage 10 to opening 8. In each of these passages, a major part thereof is formed by a portion of housing 1. In the case of passage 9, it is formed by part 3 of the housing, while in the case of passage 10 it is formed by part 2 of the housing. It will be noted that the passages 9 and 10 are joined at an internal portion 11 of housing 1 which defines the beginnings of the two passages 9 and 10 as they separate upon leaving opening 6. The openings 7 and 8 are defined by cylindrical portions 12 and 13 respectively of housing parts 3 and 2, the cylindrical portions 12 and 13 joining each other at junction 14 so that there are no openings to the exterior from housing 1 except for the three openings 6, 7, and 8 (with a single exception, to be discussed herebelow).

A central part of passage 9 is formed by a wall 15 of flexible resilient material which is, preferably, any of the more commonly available elastomeric materials. The cooperation of wall portion 15 with the housing part 3 to form passageway 9 may be best understood from viewing FIGURE 3 in addition to FIGURE 2. Similarly, there is an elastomeric wall portion 16 positioned so as to form, in cooperation with housing portion 2, the passage 10. Passages 9 and 10 may be made substantially leakproof by providing wall portions 15 and 16 with sealing edges 15a and 15b (for portion 15) and with sealing edges 16a and 16b (for portion 16). The sealing edges are clamped in the space between parts 2 and 3, and when screws 5 are tightened the desired leakproof relation is provided.

Housing parts 2 and 3 respectively have necked-down sections 17 and 18 where the distance across the passages 9 and 10 from the housing part to the elastomeric wall is at a minimum. Within the housing 1 between the two elastomeric walls 15 and 16 is an actuating member 19 movable by means of a pin 20 to which it is rigidly secured, the pin extending through a ferrule 20a, secured in an opening 21 (FIGURE 3) formed in housing 1 between sealing edges 15b and 16b, to the interior space between elastomeric walls 15 and 16. Additional support for pin 20 may be provided by a second ferrule or bearing section 22 between the portions 2 and 3 of housing 1 and sealing edges 15a and 16a. The structure of ferrule 22 is shown enlarged in FIGURE 6 for clearer understanding, it being understood that both ferrules 20a and 22 are essentially similar in construction.

The wall portion 15 is formed substantially concave relative to member 19 at the necked-down portion 18 of housing portion 3. When the pin 20 and member 19 are rotated 90° clockwise from the position shown in FIGURE 2, this causes the member 19 (which is shown in its "up" position in FIGURE 3) to assume a "down" position. When member 19 moves to its down position, it deforms the elastomeric wall 15 to force it tightly against the inside surface of necked-down section 18, the actuating member 19 being formed so as to make the elastomeric wall portion 15 have the necessary shape to mate with necked-down section 18. Also, when the member 19 moves from its up position to a down position, the elastomeric wall member 16 returns to its normal shape in which it is separated from necked-down section 17 of housing portion 2, i.e., to a position in which it opens passage 10. Conversely, when member 19 is in its up position as shown, it deforms wall 16 to close passage 10 and allows wall 15 to open passage 9. Thus, whenever the actuating member 19 closes one of the passages 9 and 10, it causes the other passage to be opened.

The necessary movement of pin 20 and member 19 may be effected by having the end 23 of the pin secured to a member 24 which is rigidly connected to armature 25 of a solenoid 26. Upon energization of the solenoid 26, member 24 is pulled upwardly by armature 25, thereby rotating pin 20 to the position to close passage 10. At other times, a spring 27 pulls the member 24 down to a position wherein the pin is rotated 90° so as to close passage 9. Thus, when solenoid 26 is energized, pin 19 is moved to the up position in which passage 10 is closed and passage 9 is opened. At all other times, the force of spring 27 closes the passage 9 by deformation of the elastomeric wall section 15 and opens passage 10.

It is will thus be seen that by a single actuating member positioned between two elastomeric wall sections which cooperate with a rigid housing to form two passages, alternative opening and closing of the passages may be obtained by appropriate deformation of the wall sections. It will, of course, be understood that while the invention has been shown as using elastomeric material, wherein one wall section 15 automatically returns to its passage-opening position when the member 19 is deforming the other wall section 16 to close passage 10, other arrangements may be provided. These include, for instance, arrangements wherein the movement of the member 19 is a rectilinear one and the member 19 is actually secured to the two wall sections 15 and 16 so that, rather than depending upon the pressure of liquid passing through passage 9 and the automatic return of wall portion 15 to the shape shown, it would actually be forced to return to that position by movement of the actuating member 19. In such a case, it will be understood that an elastomeric material in the commonly accepted sense of the work need not be used but that a simply flexible material will perform acceptably since the material will be positively moved by the actuating member both to opening and closing positions rather than only to closing position as in the present case. Also, of course, each flexible wall portion may be formed as a tubular passage section, with the inner part of it performing the function described above and the remainder serving merely as a lining for the rigid housing section which forms part of the passage.

While in accordance with the patent statutes, I have described what at present is considered to be the preferred embodiment of my invention, it will be obvious to those skilled in the art that various changes and modifications may be made therein without departing from the invention, and it is therefore aimed in the appended claim to cover all such changes and modifications as fall within the true spirit and scope of my invention.

What I claim as new and desire to secure by Letters Patent of the United States is:

A valve comprising:
- (a) an elongated housing of rigid material having a first opening formed therein at one end and second and third openings formed therein at the other end, said housing including two opposed walls, a portion of each of said walls being deformed inwardly towards the center of said housing intermediate said first opening and said second and third openings to form a restricted passageway therein, said portion of each of said walls providing a sealing surface oriented obliquely to the longitudinal axis of said housing,
- (b) a first resilient member mounted within said housing and extending between said first and said second openings to form cooperatively with one of said walls a first passage joining said first and second openings,
- (c) a second resilient member mounted within said housing and extending between said first and said third openings to form cooperatively with the other of said walls a second passage joining said first and third openings,
- (d) an actuating member pivotally mounted in said housing between said first and second members,
- (e) means for pivoting said actuating member to a first and second position, said actuating member in said first position forcing said first member into sealing relationship with the sealing surface of said one of said walls to close said first passage, said actuating member in said second position forcing said second member into sealing relationship with the sealing surface of said other of said walls to close said second passage.

References Cited in the file of this patent
UNITED STATES PATENTS

| | | |
|---|---|---|
| 2,556,689 | Grove | June 12, 1951 |
| 2,836,197 | Johnson | May 27, 1958 |
| 2,888,952 | Klaren | June 2, 1959 |